Sept. 15, 1931.  G. HOMMEL  1,823,045
SLIDING CALIPER WITH AUTOMATIC LOCKING DEVICE
Filed March 19, 1930
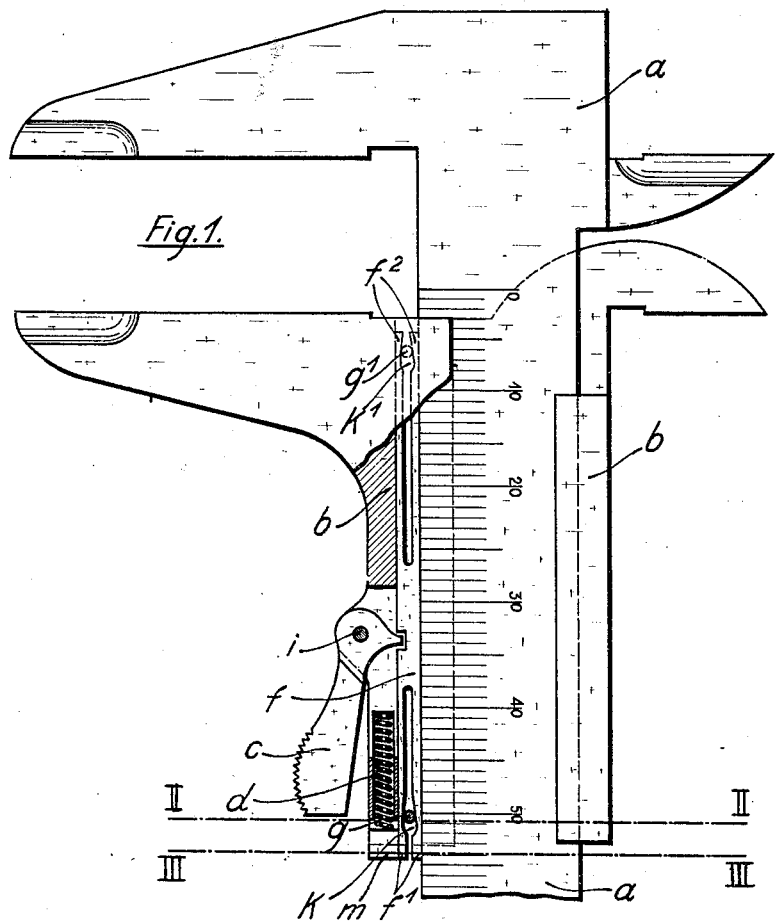

Patented Sept. 15, 1931

1,823,045

UNITED STATES PATENT OFFICE

GEORG HOMMEL, OF ALDINGEN, NEAR SPAICHINGEN, GERMANY

SLIDING CALIPER WITH AUTOMATIC LOCKING DEVICE

Application filed March 19, 1930, Serial No. 437,221, and in Germany March 11, 1929.

Most of the sliding calipers of known type with automatic locking devices present the inconvenience that their locking is either not secure enough, or that the releasing of the sliding element requires a too strong, fatiguing pressure upon the lever.

The object of this invention is to obviate these inconveniences.

An embodiment of the invention is illustrated by way of example in the accompanying drawings in which:

Fig. 1 is a front elevation of the sliding caliper

Fig. 2 is a section on line I—II and

Fig. 3 is a section on line III—III of Fig. 1.

The sliding caliper with automatic spreading springs locking device consists of the main part $a$, and sliding element $b$, the pressure lever $c$, the spiral spring $d$, the spring $f$ with the ends $f^1$ and $f^2$, the bolts $g$ and $g'$ and the bolt $i$.

The spring $f$ has cut out portions $k$ and $k'$ and a lateral projection $m$.

By the pressure exerted by the spiral spring $d$ upon the projection $m$ of the spring $f$ the latter is shifted in the sliding element $b$ and the bolts $g$ and $g'$ are pushed out of the cut-out portions $k$ and $k'$ and into the tapering slots until the parts $f'$ and $f^2$ of the spring press strongly against the main part $a$ and the sliding element $b$ and mutually securely lock these parts. As the pressure of the spring $f$ acts upon two points it is strong enough to prevent a mutual shifting of the parts $a$ and $b$ without a specially strong spiral spring $d$.

Only a light pressure upon the lever $c$ is therefore necessary to release the sliding element $b$. After the releasing of the lever $c$ the sliding element $b$ is again locked automatically on the part $a$.

Claims:

1. A sliding caliper with automatic locking device, comprising in combination with the sliding element, a spring having cut out portions and tapering slots extending from these cut out portions and said spring being adapted to serve for locking said sliding element.

2. A sliding caliper as specified in claim 1, comprising in combination with the spring slotted at both ends, bolts engaging with said slots adapted to spread said slot portions of the spring, and a spiral spring exerting pressure on said slotted spring.

In testimony whereof I affix my signature.

GEORG HOMMEL.